United States Patent Office 2,736,758
Patented Feb. 28, 1956

2,736,758

PROCESS FOR THE MANUFACTURE OF SOLUBLE CHLORINATED RUBBER BY TREATMENT OF INSOLUBLE CHLORINATED RUBBER

Gerrit Jan van Amerongen, Delft, Jacob Leendert Poldervaart, Hengelo, and Albert Schreuder, Nijverdal, Netherlands, assignors to Rubber-Stichting, Delft, Netherlands No Drawing. Application February 18, 1952, Serial No. 272,262

Claims priority, application Netherlands February 19, 1951

11 Claims. (Cl. 260—772)

This invention relates to a process for the conversion of insoluble chlorinated rubber into soluble chlorinated rubber.

The term "soluble chlorinated rubber" is intended to mean a chlorinated rubber which is soluble in aromatic hydrocarbons, chlorinated hydrocarbons, esters and ketones. This solubility is desirable for the incorporation of chlorinated rubber in paints and lacquers.

We have found it advantageous to manufacture soluble chlorinated rubber from the insoluble chlorinated rubber obtained by the chlorination of latex as described for instance in patent application Serial Number 775,155, now abandoned.

According to this invention an insoluble chlorinated rubber and an aqueous solution of an inorganic hypochlorite, both dispersed in an organic chlorinating liquid are made to act upon each other. The chlorinated rubber formed in the reaction, which may be dissolved in the organic liquid, may be precipitated. Chlorine may be introduced into the reaction mixture.

As chlorinating liquid we may use all those liquids which are not rapidly chlorinated and are solvents for soluble chlorinated rubber. We prefer using liquids having a low boiling point and which can be readily removed after the reaction by distillation, steaming or in some other manner.

Examples of suitable solvents are methylene-chloride, chloroform, carbontetrachloride, symmetric dichloroethane, 1,1,2-trichloroethane, 1,1,1-trichloroethane, symmetric tetrachloroethane, benzene, chlorobenzene, trichlorobenzene and nitrobenzene. We prefer to use carbontetrachloride and 1,1,2-trichloroethane.

As inorganic hypochlorite we prefer sodium or potassium hypochlorite.

It is also possible to form the hypochloride in the mixture by making use of the equilibrium reaction:

$$Cl_2 + OH^1 \rightleftharpoons HClO + Cl^1$$

If substances are added to the solution which increase the $OH^1$ ion concentration in the water, such as NaOH, $Na_2CO_3$, $Ca(OH)_2$, $CaCO_3$, $MgCO_3$, MgO, ZnO, $Al(OH)_3$, combination with $Cl_2$ will form a hypochlorite.

The consistency of the reaction mixture is determined by the proportion in which chlorinated rubber, organic chlorinating liquid and water are present. The quantity of water is restricted because water should not be allowed to become the continuous phase in the mixture, for otherwise the dispersion would become too labile. From the examples given below it can be seen that the amount of water is in the range of about 4.5% to about 15.5% of water based on the weight of solvent. Increase of the chlorinated rubber content leads to thickening, so that there is a practical upper limit to the content of chlorinated rubber, beyond which the mixture becomes unfit for treatment. The upper limit of the chlorinated rubber content lies at approximately 25%. We prefer starting from a mixture with a chlorinated rubber content of 10 to 15%.

Although the reaction will take place at room temperature, it is recommendable to proceed at a higher temperature, since an increase of temperature accelerates the reaction. Of course, the temperature should not be higher than the boiling point of the dispersing agent.

The quantity of hypochlorite added should as a rule be 0.2 to 3% by weight of the chlorinated rubber, and approximately 1% of hypochlorite should be added.

The soluble chlorinated rubber is recovered from the reaction mixture by precipitation with water or, alcohol or by removal of the solvent.

Since water should always be present in this process, there is no need to start from dry chlorinated rubber but freshly precipitated chlorinated rubber obtained according to the patent application Serial Number 775,155, while still wet, can serve as the starting product. In large scale production this can be of great advantage.

The following examples serve to elucidate the invention. All the examples start from an insoluble chlorinated rubber prepared by the chlorination of latex according to patent application Serial Number 775,155.

*Example I*

15 g. dry insoluble chlorinated rubber (with a chlorine content of 60.1%) were dispersed in 135 g. of carbontetrachloride, 6.7 g. of a 10% NaOH solution were added. After chlorine had been introduced during 7 hours at 50° C. under stirring, a chlorinated rubber containing 66.9% chlorine, was isolated by precipitation with methanol. A 20% solution of this chlorinated rubber in toluene had a viscosity of 4.3 cps. at 25° C.

*Example II*

30 g. dry insoluble chlorinated rubber containing 60.1% Cl were dispersed in 120 g. of carbontetrachloride, and a solution 120 mg. $Na_2CO_3$ in 16 g. of water was added. After chlorine had been introduced during 7 hours at 50° C. under stirring, a chlorinated rubber containing 65.7% chlorine was isolated by precipitation with methanol. A 20% solution of this chlorinated rubber in toluene had a viscosity of 57 cps. at 25° C.

*Example III*

A mixture of 30 g. of chlorinated rubber (with a Cl content of 60%) and 20 g. water was dispersed in 135 g. chlorobenzene. To the dispersion were added 0.9 cm.³ of a 40% NaOH solution. Chlorine was introduced at 90° C. during 7 hours under stirring. The chlorinated rubber was isolated from the reaction mixture by precipitation with methanol. The product had a Cl content of 65%. A 20% solution in toluene had a viscosity of 42 cps. at 25° C.

*Example IV*

A mixture of 30 g. of chlorinated rubber (with a Cl content of 60%) and 20 g. water was dispersed in 135 g. carbontetrachloride. To the dispersion were added 0.9 cm.³ of a 40% NaOH solution. Chlorine was introduced at 20° C. during 7 hours under stirring. The chlorinated rubber was isolated from the reaction mixture by precipitation with methanol. The product had a Cl content of 67.4%. A 20% solution thereof in toluene had a viscosity of 9 cps. at 25° C.

*Example V*

A mixture of 15 g. of chlorinated rubber (with a Cl content of 60%) and 10 g. water was dispersed in 140 g. carbontetrachloride. To the dispersion a solution of 5.6 g. of NaOCl in 5 g. of water was added. The reaction mixture was maintained at 50° C. during 7 hours. The chlorinated rubber was isolated from the reaction mixture by precipitation with water. The chlorinated rubber thus obtained was found to be soluble. A 20% toluene solution had a viscosity of 19 cps. at 25° C.

*Example VI*

A mixture of 50 kg. of chlorinated rubber (with a Cl content of 60%) and 33 kg. water was dispersed in 450 kg. carbontetrachloride and 5 kg. zinc oxide were added. Chlorine was introduced at 20° C. during 1½ hours under stirring. During this operation the temperature increased to 40° C. The chlorinated rubber was isolated from the reaction mixture by removing the solvent by means of steam. The product had a chlorine content of 66%. A 20% solution thereof in toluene had a viscosity of 20 cps. at 25° C.

*Example VII*

A mixture of 50 kg. of chlorinated rubber (with a Cl content of 60%) and 33 kg. water was dispersed in 450 kg. carbontetrachloride and 36 kg. of an aqueous paste containing 8.85% of $Al(OH)_3$ were added. Chlorine was introduced during 2 hours under stirring, the temperature increasing from 20° C. to 30° C. After having allowed the mixture to stand 24 hours, the chlorinated rubber was isolated from the reaction mixture by removing the solvent by steaming. The product had a chlorine content of 67%. A 20% solution hereof in toluene had a viscosity of 74 cps. at 25° C.

*Example VIII*

A mixture of 50 kg. of chlorinated rubber (with a Cl content of 60%) and 33 kg. water was dispersed in 450 kg. carbontetrachloride. To the dispersion were added 5 kg. $CaCO_3$. Chlorine was introduced during 3½ hours under stirring, and during this operation the temperature increased to 35° C. Thereupon another 5 kg. $CaCO_3$ were added and chlorination was resumed during 1 hour. The chlorinated rubber was isolated from the reaction mixture by removing the solvent by steaming. The product had a chlorine content of 67%. A 20% solution thereof in toluene had a viscosity of 40 cps. at 25° C.

*Example IX*

A mixture of 50 kg. of chlorinated rubber (with a Cl content of 60%) and 33 kg. water was dispersed in 450 kg. carbontetrachloride. To this dispersion were added 22 liters NaOCl solution containing 120 kg. active Cl per 1000 liters. Chlorine was introduced during 30 minutes under stirring and during this operation the temperature rose from 20° C. to 35° C. After having been allowed to stand 1 hour the chlorinated rubber was isolated from the reaction mixture by removing the solvent by steaming. The product had a chlorine content of 67%. A 20% solution thereof in toluene had a viscosity of 420 cps. at 25° C.

What we claim is:

1. The process of converting chlorinated rubber having a chlorine content of about 60% which is insoluble in aromatic hydrocarbons, chlorinated hydrocarbons, esters, or ketones, into chlorinated rubber soluble in said solvents, which comprises reacting on a dispersion of the insoluble chlorinated rubber with a dispersion of an aqueous inorganic hypochlorite solution in one of said solvents, the upper limit of concentration of insoluble chlorinated rubber being about 25% of the weight of solvent, the quantity of hypochlorite ranging from about 0.2% to about 3.0% by weight of the insoluble chlorinated rubber, and the amount of water present ranging from about 4.5% to about 15.5% of the weight of solvent.

2. The process of claim 1, in which the hypochlorite is formed in the mixture during the reaction.

3. The process of claim 1, in which the mixture of the reactants contains at least 0.5 percent by weight of ClO in the form of inorganic hypochlorite calculated on the chlorinated rubber.

4. The process of claim 1, in which the mixture of the reactants is heated 1½ hours to a temperature ranging between 20° and 90° C.

5. The process of claim 1, in which the solvent is removed at the end of the reaction by distillation to isolate the soluble chlorinated rubber.

6. The process of claim 1, in which at the end of the reaction the soluble chlorinated rubber is precipitated from the mixture.

7. The process of claim 6, in which the mixture of reactants contains at least 0.2 percent by weight of the inorganic hypochlorite, calculated on the chlorinated rubber.

8. The process of claim 6, in which the mixture of the reactants contains at least 0.2 percent by weight of the inorganic hypochlorite, calculated on the chlorinated rubber and the mixture is heated 1½–7 hours to a temperature ranging between 20° and 90° C.

9. The process of claim 6, in which the solvent is removed at the end of the reaction by steam distillation in order to isolate the soluble chlorinated rubber.

10. The process of claim 6, in which at the end of the reaction water is added to the mixture to precipitate the soluble chlorinated rubber.

11. The process of converting chlorinated rubber having a chlorine content of about 60% which is insoluble in aromatic hydrocarbons, chlorinated hydrocarbons, esters, or ketones, into chlorinated rubber having an increased chlorine content up to about 68% and which is soluble in said solvents, which comprises reacting on a dispersion of the insoluble chlorinated rubber with a dispersion of an aqueous inorganic hypochlorite solution in one of said solvents, and simultaneously passing chlorine therethrough, the upper limit of concentration of insoluble chlorinated rubber being about 25% of the weight of solvent, the quantity of hypochlorite ranging from about 0.2% to about 3.0% by weight of the insoluble chlorinated rubber, and the amount of water present ranging from about 4.5% to about 15.5% of the weight of solvent.

References Cited in the file of this patent

UNITED STATES PATENTS

| | | |
|---|---|---|
| 2,020,076 | Mollney | Nov. 5, 1935 |
| 2,376,027 | Bouchard | May 15, 1945 |
| 2,586,124 | Van Amerongen | Feb. 19, 1952 |

FOREIGN PATENTS

| | | |
|---|---|---|
| 414,862 | Great Britain | Aug. 16, 1934 |